United States Patent [19]

Cobb, III et al.

[11] Patent Number: 6,127,470
[45] Date of Patent: Oct. 3, 2000

[54] LIQUID DISPERSION COMPRISING DIBENZYLIDENE SORBITOL ACETALS ETHOXYLATED NONIONIC SURFACTANTS

[75] Inventors: James D. Cobb, III, Spartanburg; Jack L. Rolen, Campobello; Nathan A. Mehl, Moore, all of S.C.

[73] Assignee: Millken & Company, Spartanburg, S.C.

[21] Appl. No.: 09/487,886

[22] Filed: Jan. 20, 2000

Related U.S. Application Data

[63] Continuation of application No. 09/148,170, Sep. 4, 1998, Pat. No. 6,102,999.

[51] Int. Cl.$^7$ .............................. C08K 5/06; C08F 6/00; C08J 3/205
[52] U.S. Cl. .................. 524/367; 524/376; 524/378; 528/494
[58] Field of Search ................... 524/367, 376, 524/378; 525/385; 528/494

[56] References Cited

U.S. PATENT DOCUMENTS

| | | | |
|---|---|---|---|
| 3,721,682 | 3/1973 | Murai et al. | 260/340.7 |
| 4,429,140 | 1/1984 | Murai et al. | 549/370 |
| 4,562,265 | 12/1985 | Machell | 549/364 |
| 4,902,807 | 2/1990 | Kobayashi et al. | 549/364 |
| 5,672,340 | 9/1997 | Sun et al. | 424/66 |
| 5,731,474 | 3/1998 | Scrivens et al. | 568/592 |
| 5,964,691 | 10/1999 | Mehl | 516/20 |

*Primary Examiner*—Tae Yoon
*Attorney, Agent, or Firm*—Terry T. Moyer; William S. Parks

[57] ABSTRACT

This invention relates to a fluid dispersion of at least one dibenzylidene sorbitol acetal derivative. The sorbitol acetal derivative is useful as a clarifying agent for polyolefins and the inventive fluid dispersion permits improvements in the handling and processing of and mixing within the polyolefin composition. The inventive dispersion must be shelf stable, retain its nucleating effects, be compatible with polypropylene (and other polyolefins), and possess both short-term and long-term viscosities which permit acceptable transport through a standard polyolefin-manufacturing peristaltic pump. The preferred inventive dispersion thus comprises 3,4-DMDBS and at least one ethoxylated nonionic surfactant having an HLB of greater than about 8.5. Preferred surfactants include those selected from the group consisting essentially of ethoxylated sorbitan ($C_8$–$C_{22}$) monoesters and ethoxylated nonyl-phenol ethers. The inventive dispersion may be introduced within any polyolefin composition, preferably polypropylene, which may then be molded into any shape or form. A method of producing a polyolefin plastic utilizing the inventive dispersion is also provided.

6 Claims, No Drawings

LIQUID DISPERSION COMPRISING DIBENZYLIDENE SORBITOL ACETALS ETHOXYLATED NONIONIC SURFACTANTS

CROSS REFERENCE TO RELATED APPLICATIONS

This application is a continuation of application 09/148,170, filed on Sep. 4, 1998, now allowed as U.S. Pat. No. 6,102,999. This parent application is herein entirely incorporated by reference.

FIELD OF THE INVENTION

This invention relates to a fluid dispersion of at least one dibenzylidene sorbitol acetal derivative. The sorbitol acetal derivative is useful as a clarifying agent for polyolefins and the inventive fluid dispersion permits improvements in the handling and processing of and mixing within the polyolefin composition. The inventive dispersion must be shelf stable, retain its nucleating effects, be compatible with polypropylene (and other polyolefins), and possess both short-term and long-term viscosities which permit acceptable transport through a standard polyolefin-manufacturing peristaltic pump. The preferred inventive dispersion thus comprises 3,4-DMDBS and at least one ethoxylated nonionic surfactant having an HLB of greater than about 8.5. Preferred surfactants include those selected from the group consisting essentially of ethoxylated sorbitan ($C_8$–$C_{22}$) monoesters and ethoxylated nonyl-phenol ethers. The inventive dispersion may be introduced within any polyolefin composition, preferably polypropylene, which may then be molded into any shape or form. A method of producing a polyolefin plastic utilizing the inventive dispersion is also provided.

BACKGROUND OF THE PRIOR ART

Dibenzylidene sorbitol acetals ("DBS"), substituted DBS, such as can be made with alkyl substituted aromatic aldehydes, and related acetals have found utility as nucleating agents, clarifying agents, gelling agents, processing aids, and strength modifiers in polyolefin resins, polyester resins, deodorant, and antiperspirant compositions; hydrocarbon fuels; waste liquids, especially those containing organic impurities; and paint.

DBS derivative compounds are typically prepared by the condensation reaction of two moles of an aromatic aldehyde with one mole of a polyhydric alcohol, such as xylitol or sorbitol. Examples of suitable processes may be found in Murai et al., U.S. Pat. No. 3,721,682; Murai et al., U.S. Pat. No. 4,429,140; Machell, U.S. Pat. No. 4,562,265; Kobayashi et al., U.S. Pat. No. 4,902,807; and Scrivens et al., U.S. Pat. No. 5,731,474. All of these references are hereby incorporated by reference in their entirety.

DBS is generally provided in powder or pellet form prior to introduction within polyolefin formulations. The DBS will basically melt into the polyolefin upon exposure to sufficient heat and then be mixed throughout the resultant composition. Such a powder or pellet form presents certain problems and limitations upon use of the DBS. For instance, such solid forms are difficult to handle and thus may easily be spilled or lost upon use; powder forms provide potentially hazardous dusting problems; powder forms also tend to present flow difficulties within molding machinery; and pellet forms also require duplicitous extruding costs. Such waste and/or cost of product is undesirable because the cost of DBS is relatively high. Pellet and powder forms also provide difficulty during processing as thorough melting or mixing may not be accomplished. Thus, a liquid form for DBS is both wanted and necessary to lower costs and facilitate mixing with target polyolefin compositions. To date, it is believed that there; are no teachings or fair suggestions of a fluid dispersion of a polyolefin clarifying or nucleating agent. The difficulties associated with processing, such as proper low viscosities and continuous compatibility of the DBS-containing dispersion with the desired polyolefins have heretofore been too problematic, primarily due to the intrinsic thixotropic characteristics of DBS derivatives.

OBJECTS OF THE INVENTION

Therefore, an object of the invention is to provide a fluid dispersion of DBS which exhibits low viscosities upon storage of long duration. A further object of the invention is to provide a polyolefin nucleating agent in a fluid dispersion which may be added at the fabrication stage (i.e., directly within an injection molder). Another object of the invention is to provide a relatively inexpensive fluid dispersion of DBS which is compatible with polyolefin resins and thus retains its ability to clarify and nucleate such thermoplastics. Additionally, it is an object of this invention to provide a DBS fluid dispersion which may be used in clarified polyolefin media for use as storage containers for foodstuffs and liquids for human consumption as well as for use as medical-related articles and devices.

DETAILED DESCRIPTION OF THE INVENTION

The inventive fluid dispersion comprises basically at least one dibenzylidene sorbitol acetal (DBS) derivative and at least one ethoxylated nonionic surfactant having an HLB of greater than about 8.5. Preferably, the surfactant has an HLB within the range of from about 9.0 to about 17.0 and most preferably from about 9.5 to about 14.5. Furthermore, the surfactant is preferably added in an amount of at least about 60% by weight of the total composition and most preferably in an amount of at least 70% by weight.

Also contemplated within this invention is a method of producing a fluid dispersion of a polyolefin clarifying agent comprising the steps of (a) providing a liquid composition of at least one dibenzylidene sorbitol acetal; and (b) introducing at least one liquid ethoxylated nonionic surfactant having an HLB of greater than about 8.5. The same preferred ranges of HLB levels and proportions listed above apply within the inventive method of making, also.

Any DBS derivative compound may be introduced within the inventive fluid dispersion and method. Specific DBS derivatives include, as merely examples:

1,3:2,4-dibenzylidene sorbitol; 1,3:2,4-di(p-methylbenzylidene) sorbitol; 1,3 :2,4-di(p-chlorobenzylidene) sorbitol; 1,3:2,4-di(2,4-dimethyldibenzylidene) sorbitol; 1,3:2,4-di(p-ethylbenzylidene) sorbitol, abbreviated as EBS; and 1,3:2,4-di(3,4-dimethyldibenzylidene) sorbitol, abbreviated as 3,4-DMBS. Of particular interest and the preferred DBS derivative is 3,4-DMBS. Such a diacetal compound, as well as any type of DBS system, may be produced through the condensation reaction between two moles of an aromatic aldehyde and one mole of a polyhydric alcohol. The aldehyde and polyhydric alcohol are generally provided in the reaction mixture in a ratio from 1:1 to 4:1, preferably 1.5:1 to 2.5: 1, respectively. The aromatic aldehydes are single or fused double ring aldehydes having at least one unsaturated hydrocarbon ring, and include benzaldehyde, naphthaldehyde, indan aldehyde and tetrahydronaphthaldehyde (tetralin aldehyde). The aromatic aldehydes may be unsubstituted or have from one to five substituent groups selected from $C_{1-4}$ alkyl, $C_{1-4}$ alkoxy, hydroxy, halogen, $C_{1-6}$ alkylthio, $C_{1-6}$ alkylsulfoxy, $C_{3-5}$ alkylene forming a carbocyclic ring with adjacent carbon atoms on an unsaturated hydrocarbon ring, carboxyl, ($C_1$–$C_{20}$ alkyloxy)carbonyl, ($C_1$–$C_{20}$ alkyloxy)ethyloxycarbonyl, ($C_{1-12}$ alkyl)phenyl, halogenated phenyl, ($C_1$–$C_{12}$ alkoxy)phenyl, ($C_1$–$C_{12}$ alkyloxy)ethyloxyethyloxycarbonyl and ($C_1$–$C_{12}$ alkyloxy)ethyloxy-ethyloxyethyloxycarbonyl groups. Preferably, the aromatic aldehyde is selected from unsubstituted benzaldehyde, benzaldehyde having from one to three substituent groups selected from $C_{1-4}$ alkyl, halogen and $C_{3-5}$ alkylene forming a carbocyclic ring with adjacent carbon atoms on an unsaturated hydrocarbon ring, including p-methyl, p-ethyl, 2,4-dimethyl, 3,4-dimethyl and 2,4,5-trimethyl benzaldehyde, 5-indan aldehyde and 5',6',7',8'-tetrahydro-2-naphthaldehyde.

Mixtures of the aromatic aldehydes may be provided and will result in a distribution of diacetals having the same or different aromatic components, referred to as symmetric and asymmetric diacetals, respectively. The aromatic aldehydes typically react with the polyhydric alcohol to form acetals in the 1:3 and 2:4 positions. Also within the scope of the present invention are triacetals formed by the condensation of three moles of an aromatic aldehyde and one mole of a polyhydric alcohol having six or more hydroxyl groups. The triacetals are typically formed at the 1:3, 2:4 and 5:6 positions of the alcohol.

The polyhydric alcohols have five or more hydroxyl groups. The sugar alcohols represented by the formula $HOCH_2(CHOH)_n CH_2OH$, where n=3–5, have been found to be especially useful. Preferably, the polyhydric alcohol is a pentahydric or hexahydric alcohol, most preferably xylitol or sorbitol. The polyhydric alcohol can be added to the reaction mixture as a solid, molten liquid, or as an aqueous solution. Preferably, the polyhydric alcohol is concentrated to a syrup by the azeotropic removal of water with a hydrophobic solvent, such as cyclohexane, prior to addition.

One particular method of producing such DBS derivatives is outlined within U.S. Pat. No. 5,731,474, to Scrivens et al., heretofore fully incorporated within this specification.

In order to develop a proper DBS derivative fluid dispersion, a number of significant criteria had to be met initially. For instance, shelf stability of the dispersion product was of utmost necessity, particularly for long duration. Tests for such storage were made for at least 30 days at elevated temperatures (i.e., 50° C.) in order to simulate storage times of approximately 6 months or greater. By shelf stability, it is intended that the dispersion does not exhibit an appreciable degree of gelation after storage at relatively high temperatures. Also critical to such dispersions is a low viscosity, again, in particular after long-term storage, of lower than about 25,000 centipoise at about 25° C. A viscosity which is too high would deleteriously affect the pumpability of the DBS dispersion through a standard pump utilized in plastics fabrication plants, such as a peristaltic pump. Furthermore, the dispersion itself, including any additives, must be compatible with and must not react in any deleterious manner with the target polyolefin and furthermore, must not render the DBS compound incompatible with the target polyolefin. Such deleterious reactions would include causing screw slippage within the polyolefin extruder; producing black specks within the nucleated polyolefin; plating out on the mold; increasing the cycle time required to produce the final polyolefin article; and blooming within the final nucleated polypropylene product. Lastly, it is highly desirous to produce a DBS fluid dispersion which is comprised of components which are acceptable in conjunction with articles and containers associated with goods for human consumption.

As noted above, it has been determined that the best surfactants available to produce a fluid dispersion of DBS exhibiting the necessary characteristics outlined above are those which are nonionic and which are ethoxylated to the extent that their hydrophilic-lipophilic balance (HLB) is greater than about 8.5. HLB is a measure of the solubility of a surfactant both in oil and in water and is approximated as one-fifth (⅕) the weight percent of ethoxy groups present on the particular surfactant backbone. Generally, the higher the HLB, the more soluble the surfactant is in water, whereas the lower the HLB, the more soluble it is in oil. Such solubility appears to affect the ability of DBS systems to be incorporated into fluid dispersions which are acceptable in the processing and production of nucleated polyolefin compositions. The stability and low viscosity of the inventive fluid dispersion greatly depends on a properly selected surfactant having a specific HLB level. Additionally, the surfactants must be nonionic in nature, without any latent electric charge. Any positively or negatively charged components appear to thicken the dispersion to a point of non-utility in a standard polyolefin peristaltic pump and also appear to react deleteriously with the DBS clarifying agent to render the compound incompatible with the target polyolefin. Thus, the surfactants of utility with the inventive dispersion must exhibit an HLB of greater than about 8.5, more preferably greater than about 12, and most preferably greater than about 13; must be nonionic and thus exhibit no charge; and must possess at least some degree of ethoxylation, more preferably greater than about 4 molar equivalents of ethylene oxide (EO) per molecule, and most preferably greater than about 9.5 molar equivalents of EO per molecule.

It was thus determined that the surfactants which provide all of the beneficial characteristics mentioned above in tandem with the various DBS systems, and particularly 3,4-DMDBS, include ethoxylated nonionic surfactants having HLB levels of greater than about 8.5. The more specific and thus preferred types of such surfactants include ethoxylated sorbitan ($C_8$–$C_{22}$) monoesters, ethoxylated nonylphenol ethers, and any mixtures thereof of any such specific high HLB ethoxylated nonionic surfactants. The term ethoxylated nonylphenol ethers is intended to include ethoxylated dinonylphenol ethers as well.

Of these preferred surfactants, the most preferred for utilization within the inventive fluid dispersion and method include, in tabulated form:

TABLE 1

Preferred Diluent Surfactants (with Tradenames)

| Ex. | Surfactant | Available as and From | HLB # |
|---|---|---|---|
| 1 | sorbitan monooleate (20 EO) | Tween 80 ®; Imperial Chemical (ICI) | 15.0 |
| 2 | sorbitan monostearate (20 EO) | Tween 60 ®; ICI | 14.9 |
| 3 | sorbitan monopalmitate (20 EO) | Tween 40 ®; ICI | 15.6 |
| 4 | sorbitan monolaurate (20 EO) | Tween 20 ®; ICI | 16.7 |

TABLE 1-continued

Preferred Diluent Surfactants (with Tradenames)

| Ex. | Surfactant | Available as and From | HLB # |
|---|---|---|---|
| 5 | dinonylphenol ether (7 EO) | Igepal ® DM 430; Rhône-Poulenc (RP) | 9.5 |
| 6 | nonylphenol ether (6 EO) | Igepal ® CO 530; RP | 10.8 |
| 7 | nonylphenol ether (12 EO) | Igepal ® CO 720; RP | 14.2 |
| 8 | dinonylphenol ether (9 EO) | Igepal ® DM 530; RP | 10.6 |
| 9 | nonylphenol ether (9 EO) | Igepal ® CO 630; RP | 13.0 |
| 10 | nonylphenol ether (4 EO) | Igepal ® CO 430; RP | 8.8 |
| 11 | dodecylphenol ether (5.5 EO) | Igepal ® RC 520; RP 430 | 9.6 |
| 12 | dodecylphenol ether (9.5 EO) | Igepal ® RC 620; RP | 12.3 |
| 13 | dodecylphenol ether (11 EO) | Igepal ® RC 630; RP | 13.0 |
| 14 | nonylphenol ether (9.5 EO) | Syn Fac ® 905; Milliken & Company | ~13 |
| 15 | octylphenol ether (10 EO) | Triton ® X-100; Rohm & Haas | 13.5 |

This list is not exhaustive as these are merely the preferred surfactants within the inventive composition and method.

The DBS component comprises at most 40% by weight, preferably about 30% by weight, of the entire inventive fluid dispersion. Any higher amount will deleteriously affect the viscosity of the dispersion. Preferably the amount of surfactant is from about 70% to about 99.9%, more preferably from about 70% to about 85%; and most preferably, from about 70% to about 75% of the entire inventive fluid dispersion. A certain amount of water may also be present in order to effectively lower the viscosity of the overall liquid dispersion. Optional additives may include plasticizers, antistatic agents, stabilizers, ultraviolet absorbers, and other similar standard polyolefin thermoplastic additives. Other additives may also be present within this composition, most notably antioxidants, antistatic compounds, perfumes, chlorine scavengers, and the like.

The term polyolefin or polyolefin resin is intended to encompass any materials comprised of at least polyolefin compound. Preferred examples include polypropylene, polyethylene, polybutylene, and any blends or copolymers thereof, whether high or low density in composition. The term thermoplastic is well known in the art to mean a polymeric material which will melt upon exposure to sufficient heat but will retain its solidified state, but not prior shape without use of a mold, upon sufficient cooling. The nucleated polyolefin is intended to be utilized as, for instance and not by limitation, medical devices, such as syringes, intravenous supply containers, and blood collection apparati; food packages; liquid containers, such as for drinks, medicines, shampoos, and the like; apparel cases; microwaveable articles; shelves; cabinet doors; mechanical parts; automobile parts; and any article where the effects of nucleation may be advantageous.

Further criteria which the particular DBS/surfactant fluid dispersion must exhibit includes thermal stability while undergoing high melting temperatures during the extrusion or molding process; no degradation of the polyolefin either during processing or once the final product is made; cost effectiveness so as not to translate into higher prices for the consumer; transparency (good haze value) of the clarified polyolefin is uniform throughout the entire finished product; no appreciable effects on the physical properties or coloring effects of the target polyolefin; and homogeneity of dissolution of the DBS derivative within the target polyolefin and thus no contribution to concentration gradients (settling) upon centrifugation. The inventive fluid dispersion and method exhibits all of these necessary characteristics which thus shows the care and degree of analysis required in order to select the proper surfactant or surfactants for the combination with the desired DBS system. This inventive liquid dispersion cannot be present in solid or gel form as the viscosities of such states of matter would invariably be too high to perform to any effective degree in the production of a polyolefin composition through the utilization of a standard polyolefin peristaltic pump. Therefore, the inventive dispersion must be present in a liquid state at, at least, ambient temperature and pressure (i.e., about 25° C. and 1 atmosphere).

PREFERRED EMBODIMENTS OF THE INVENTION

Examples of particularly preferred fluid dispersions within the scope of the present invention are presented below.

Production of Fluid Dispersions

The DBS was mixed with the particular surfactants in the proportions listed below and stirred for the amount of time indicated. The specific dispersions were analyzed for their individual viscosities at different time intervals after mixing and storage at the listed temperatures and at ambient pressure (1 atmosphere) and were also examined for their stability upon 30 days storage. The results are included in the table below:

TABLE 2

Viscosities and Stabilities of DBS/Surfactant Fluid Dispersions

| DBS (% by wt) | Surfactant (Ex. # - TABLE 1) in wt % | Viscosity (Day #) (in poise) | | | | |
|---|---|---|---|---|---|---|
| | | 1 | 7 | 14 | 21 | 30 |
| 3,4-DMBS (30%) | 1 (70%) | 22.0 | 24.0 | 22.9 | 17.6 | 17.1 |
| 3,4-DMBS (30%) | 5 (70%) | 4.0 | 14.3 | 15.1 | 15.1 | 15.1 |
| 3,4-DMBS (30%) | 7 (70%) | 4.0 | 13.8 | 10.3 | 10.8 | 10.7 |
| 3,4-DMBS (30%) | 14 (70%) | 4.9 | 11.0 | 12.9 | 12.6 | 12.5 |
| EBS (30%) (Comparative Example) | 14 (70%) | 19.3 | 22.5 | 23.2 | 23.0 | 23.0 |
| 3,4-DMBS (30%) | Span ® 80* (70%) | 17.8 | 36.8 | 35.0 | 33.3 | 33.2 |

*Sorbitan monooleate having an HLB of 4.3, available from ICI

Clearly, the ethoxylated high HLB nonionic surfactants provided long-term acceptable viscosities for the DBS fluid dispersions while the non-ethoxylated low HLB nonionic surfactant did not.

Production of Clarified Polypropylene with DBS/Surfactant Fluid Dispersions

Some of the fluid dispersions produced above were then introduced within an injection molding operation for a polyolefin thermoplastic, namely polypropylene. A metering system was utilized whereby the surfactant (or surfactants) is added by way of a peristaltic transfer pump, either continuously or, preferably, intermittently into the injection molding machine (such as an Arburg Molder). At the same time, the polypropylene resin was fed into the throat of the molding machine by way of a screw which works in concert with the transfer pump metering the DBS fluid dispersion. The rotating screw drew the resin pellets into the feed throat while the pump activated introduction of the DBS fluid dispersion into the same area of the machine (in this manner a consistent ratio of pellets to DBS were utilized in the melt compounding procedure). At that point, the mix of DBS fluid dispersion and polypropylene pellets was either fed into a mixing chamber within the molding machine or gravity fed directly into the feed section of the molder. Upon mixing or upon placement within the feed section, the pellets were subsequently melted. In the feed section, melting was accomplished through the utilization of a heated (heat transferred from the barrel of the machine) screw extruder which rotated. The rotating screw also effectuated thorough mixing of the DBS fluid dispersion and the molten resin, together producing a uniform plastic melt which was then injected into a mold in order to form the desired thermoplastic article.

Testing for nucleating effect and other important criteria were accomplished through the formation of clarified polypropylene thermoplastic resin. These plaques were formed through the process outlined above with the specific compositions listed below in Table 3 for DBS fluid dispersions.

TABLE 3

DBS/Surfactant Fluid Dispersions Used to Form Polypropylene Thermoplastic Plaques

| Plaque # | Surfactant (Ex. #) from TABLE 1) in wt % | wt % of 3,4-DMBS |
|---|---|---|
| 1 | 70% of Ex. #14 | 30% |
| 2 | 70% of Ex. #7 | 30% |
| 3 (Comparative Plaques) | 70% of Ex. #5 | 30% |
| 4 | 70% sorbitan monooleate (HLB of 4.3) | 30% |
| 5 | 70% mineral oil (HLB of 0) | 30% |

These plaque formulations are, of course, merely preferred embodiments of the inventive article and method and are not intended to limit the scope of this invention. The resultant plaques were then tested for effectiveness as dispersions within each formed resin plaque as well as percent haze (through the utilization of a Hazemeter) and peak crystallization temperatures (by Differential Scanning Calorimetry).

Such a Dispersion test is empirical and objective in nature utilizing an eye view analysis of resultant clarified resins. A performance ranking system was developed from 1 to 5 indicating the following:

| 1 | poor |
| 2 | unsatisfactory |
| 3 | satisfactory |
| 4 | very good |
| 5 | excellent |

Ten plaques produced through the same procedure and with the same DBS fluid dispersion were prepared and ranked individually. An average ranking was then taken from those ten which was the ranking given overall for the specific DBS fluid dispersion. An overall ranking of 3 or higher is considered acceptable for clarifying polypropylene thermoplastic articles on a large scale.

Haze value was measured by producing samples plaques, each having a thickness of about 50 mil (0.05 inches) and utilizing a Hunter Hazemeter to detect the degree of nucleation within the polyolefin product. A reading of about or below 20 to 21% is considered acceptable.

Crystallization is important in order to determine the time needed to form a solid from the molten polyolefin/DBS composition. Generally, polyolefins such as polypropylene have a crystallization temperature of about 90° C. In order to reduce the amount of time needed to form the final product, as well as to provide the most effective nucleation for the polyolefin, the best DBS compound added will invariably also provide the highest crystallization temperature for the final polyolefin product. To measure these temperatures, the specific polyolefin/DBS liquid dispersion composition was heated from 60° C. to 220° C. at a rate of 20° C. per minute to produce a molten formulation and held at the peak temperature for 2 minutes. At that time, the temperature was then lowered at a rate of 20° C. per minute until it reached the starting temperature of 60° C. The crystallization temperature was thus measured as the peak maximum during the crystallization exotherm.

The following Table lists the performance rankings, haze values, and crystallization temperatures for the plaques prepared in Table 3:

TABLE 4

Performance Rankings, Haze Values, and Crystallization Temperatures for Plaques in TABLE 3

| Plaque # from TABLE 3 | Dispersion Ranking | Haze Value | Crystallization Temperature |
|---|---|---|---|
| 1 | 4.5 | 13.0 | 113.77° |
| 2 | 4.0 | 20.7 | 113.63° |
| 3 | 3.0 | 12.8 | 113.59° |
| 4 | 2.0 | 12.4 | 114.12° |
| 5 | 1.0 | 7.6 | 113.89° |

The plaques produced with the inventive DBS fluid dispersions (1 through 3) thus exhibited acceptable clarifying performance, haze measurements, and crystallization temperatures, while the plaques produced with the comparative fluid dispersions were clearly unacceptable by not meeting all of these criteria.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A method of producing a nucleated polyolefin composition comprising the steps of
   (a) providing a liquid dispersion of a polyolefin nucleating agent comprising
      at least one dibenzylidene sorbitol acetal derivative; and
      at least one nonionic surfactant;
   (b) introducing said liquid dispersion into a molten polyolefin composition, thereby producing a mixture of polyolefin and nucleating agent;
   (c) extruding said mixture of polyolefin and nucleating agent; and
   (d) allowing said extruded mixture of polyolefin and nucleating agent to cool.

2. The method of claim 1 wherein said nonionic surfactant is ethoxylated and possesses a HLB balance greater than about 8.5.

3. The method of claim 2 wherein said ethoxylated nonionic surfactant is selected from the group consisting of ethoxylated sorbitan ($C_8$–$C_{22}$) monoesters, ethoxylated nonylphenol ethers, ethoxylated octylphenol ethers, and any mixtures thereof, and is present in amount of at least about 60% by weight of the total composition.

4. The method of claim 1 wherein said dibenzylidene sorbitol acetal derivative is 1,3:2,4-di(3,4-dimethyldibenzylidene) sorbitol.

5. The method of claim 2 wherein said ethoxylated nonionic surfactant has an HLB between about 9.0 and about 17.0, and is present in an amount of at least about 70% by weight of the total composition.

6. The method of claim 5 wherein said ethoxylated nonionic surfactant has an HLB between about 9.5 and about 14.5.

* * * * *